United States Patent
Cronin et al.

(10) Patent No.: US 10,248,122 B2
(45) Date of Patent: Apr. 2, 2019

(54) AUTONOMOUS CONCESSIONS ROBOTS

(71) Applicant: Panasonic Intellectual Property Management Co., Ltd., Osaka (JP)

(72) Inventors: John Cronin, Bonita Springs, FL (US); Jonathan T. Goguen, Brookline, NH (US); Michael Glynn D'Andrea, Burlington, VT (US)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 15/906,643

(22) Filed: Feb. 27, 2018

(65) Prior Publication Data

US 2018/0246513 A1    Aug. 30, 2018

Related U.S. Application Data

(60) Provisional application No. 62/464,684, filed on Feb. 28, 2017.

(51) Int. Cl.
| | |
|---|---|
| *G07F 11/46* | (2006.01) |
| *G05D 1/00* | (2006.01) |
| *G06Q 20/18* | (2012.01) |
| *G05D 1/02* | (2006.01) |

(52) U.S. Cl.
CPC ......... *G05D 1/0088* (2013.01); *G05D 1/0212* (2013.01); *G06Q 20/18* (2013.01); *G07F 11/46* (2013.01)

(58) Field of Classification Search
None
See application file for complete search history.

(56) References Cited

U.S. PATENT DOCUMENTS

| | | | |
|---|---|---|---|
| 5,367,452 A | 11/1994 | Gallery et al. | |
| 2002/0125263 A1* | 9/2002 | Credle, Jr. | B62B 5/0026 221/3 |
| 2004/0019406 A1* | 1/2004 | Wang | B25J 5/007 700/231 |
| 2008/0129487 A1 | 6/2008 | Crucs | |
| 2010/0100241 A1* | 4/2010 | Jarisch | A47J 31/407 700/259 |
| 2010/0299177 A1 | 11/2010 | Buczkowski et al. | |
| 2015/0051990 A1* | 2/2015 | Bubley | G06Q 10/087 705/15 |
| 2015/0120094 A1* | 4/2015 | Kimchi | B64C 39/024 701/3 |
| 2017/0011580 A1* | 1/2017 | Huang | G06Q 10/30 |
| 2018/0053369 A1* | 2/2018 | High | G01C 21/343 |
| 2018/0056843 A1* | 3/2018 | Michalski | B60P 3/0257 |

\* cited by examiner

*Primary Examiner* — Timothy R Waggoner
(74) *Attorney, Agent, or Firm* — McDermott Will & Emery LLP

(57) ABSTRACT

Systems and methods for autonomous concessions robots are described herein. An exemplary concessions robot device may include a body comprising a dispensing container for holding one or more items to be dispensed, a motor, wheels, a communication interface that receives instructions sent over a communication network regarding a designated route, and a processor that executes the received instructions to automatically power up the motor, propel the body forward, and steer the wheels along the designated route. The items from the dispensing container may be dispensed at one or more points on the designated route.

14 Claims, 12 Drawing Sheets

AUTONOMOUS CONCESSIONS ROBOTS

CROSS REFERENCE TO RELATED APPLICATIONS

This application claims priority to U.S. Provisional Application No. 62/464,684 filed on Feb. 28, 2017, the entire contents of which are hereby incorporated by reference.

BACKGROUND

Field of Disclosure

The present disclosure generally relates to concessions robots. In particular, the present disclosure relates to autonomous concession robots.

Description of the Related Art

Many theme parks, resorts, and similar types of service providers may wish to provide concessions to their guests. Generally, such concessions may be dispensed through in-person outlets, including movable carts, as well as vending machines.

Providing certain goods and services at in-person outlets may be more time-consuming and require larger footprints in terms of space than automated vending machines.

Vending machines are generally stationary, however. While they may be moved, they are generally so heavy and unwieldy that it may likewise be time-consuming and space-intensive to do so.

There is, therefore, a need in the art for improved systems and methods for autonomous concession robots.

SUMMARY OF THE DISCLOSURE

Embodiments of the present disclosure include systems and methods for autonomous concession robots. An exemplary concessions robot device may include a body comprising a dispensing container for holding one or more items to be dispensed, a motor, wheels, a communication interface that receives instructions sent over a communication network regarding a designated route, and a processor that executes the received instructions to automatically power up the motor, propel the body forward, and steer the wheels along the designated route. The items from the dispensing container may be dispensed at one or more points on the designated route.

DETAILED DESCRIPTION

Embodiments of the present disclosure include systems and methods for autonomous concession robots. An exemplary concessions robot device may include a body comprising a dispensing container for holding one or more items to be dispensed, a motor, wheels, a communication interface that receives instructions sent over a communication network regarding a designated route, and a processor that executes the received instructions to automatically power up the motor, propel the body forward, and steer the wheels along the designated route. The items from the dispensing container may be dispensed at one or more points on the designated route.

Such an autonomous concessions robot may be programmed to sell food and/or other items within a venue (e.g., resort or theme park). Such an autonomous concessions robot or an associated central resort server may intelligently monitor certain information to predict future need and act accordingly. For example, monitored information may include locations of patrons (e.g., to gauge current demand), staff locations (e.g., to determine ability to meet current demand), attraction conditions (e.g., to predict maintenance needs), and concession consumption (e.g., to predict future demand). Both the route of the concessions robot and its inventory may be updated based on changes in the tracked data in order to ensure the concession robots are in the location with the highest demand with the products in highest demand at the specified location.

Such a system may further enable more targeted marketing, as well as allow for greater flexibility in the locations in which products are marketed. A concessions robot for dispensing lemonade may be moved as needed, such that on a hot day, multiple robots may be servicing an area that is especially crowded or hot. When conditions change (e.g., the crowd disperses or the day grows cold), however, the concessions robot may be moved to a new service area or switched to dispensing a hot chocolate.

In some embodiments, the robot may be used to count patrons in crowds and make predictions as to where to move to sell concessions based on the number and distribution of patrons in the crowd. In addition, the robot may consider inventory (e.g., only children's gifts remaining) may evaluate the age of patrons (e.g., child age) and make decisions to route to the patrons for whom the inventory may be of interest. The robot may also assist with providing directions or guiding patrons within the venue. In some embodiments, the patrons could request special orders from the robot to be fulfilled later in the day (e.g., as inventory may be ordered and replenished). The system data may further be analyzed by artificial intelligence modules to determine concession trends and thereby adjust the places and times of robot routes.

Figure 1B:
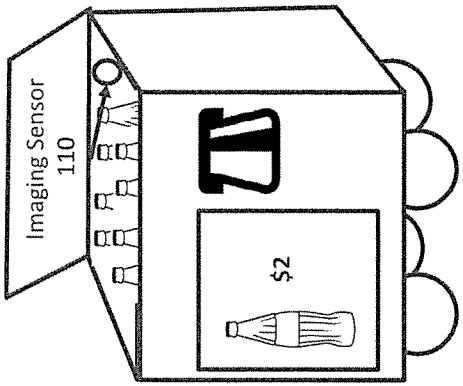
FIGS. 1A-C illustrate exemplary parts of an autonomous concession robot.
Figure 1A:
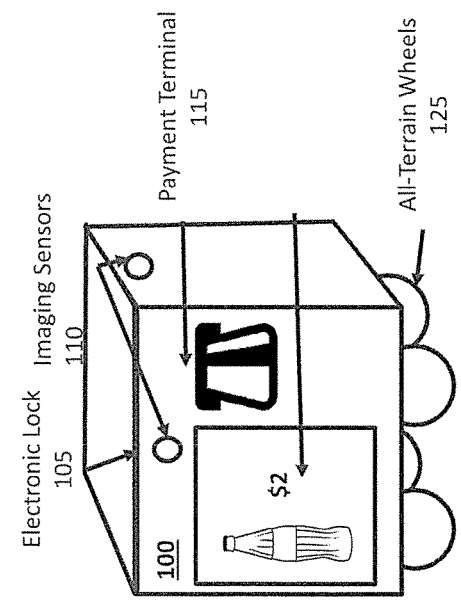
Figure 1C:
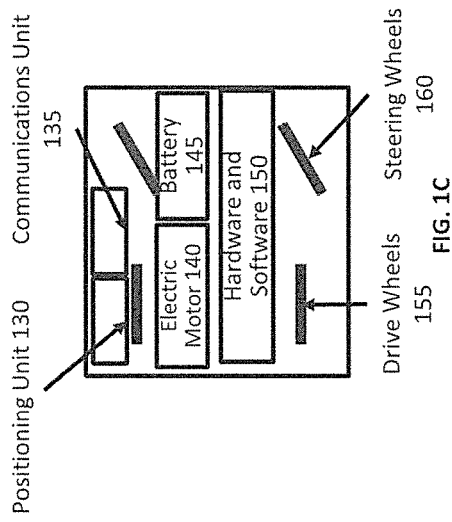

FIGS. 1A-C illustrate exemplary autonomous concession robot 100. FIG. 1A illustrates the robot 100 as including an electronic lock 105, imaging sensors 110, payment terminal 115, display screen (e.g., displaying inventory, prices) 120, and all-terrain wheels 125. As illustrated, the electronic lock 105 has been engaged (and the dispensing container is closed), which is the mode in which the robot 100 navigates the venue. Such configuration remains until a payment is made successfully, at which point the electronic lock 105 disengages. Upon disengagement of the electronic lock 105, the configuration of the robot 100 is changed to that illustrated in FIG. 1B.

FIG. 1B illustrates the robot 100 following a successful submission of payment information and after release of the electronic lock 105. Releasing the electronic lock 105 allows for the dispensing container to be opened so as to give the customer access to a dispensed item. An imaging sensor 110 may also be placed within the dispensing container to capture information regarding how many items are available to be dispensed, what items has been retrieved by the customer, and which kinds. If the user was to remove 3 bottles, for example, the credit card may automatically be charged for the cost of 3 bottles (e.g., $6).

The imaging sensors 110 may be distributed and located on multiple sides of the robot 100 body, so as to provide a 360° view of its surroundings. The robot 100 also has a payment terminal 115 (e.g., card reader, chip reader, cash slot, NFC reader to accept mobile device payments). The robot 100 may also have a display screen 120 that shows the item or items for sale and the price. In some instances, the robot 100 may further include elements (e.g., processor, memory) of a computing device such as described in detail with respect to FIG. 8.

FIG. 1C illustrates some other components, which may be located internally or on the underside (or other inaccessible area) of the robot 100. These components may include a positioning unit 130, a communications unit 135, electric motor 140, battery 145, and various other robotic hardware and software 150. Further, as illustrated, the wheels 125 may include both drive wheels 155 (e.g., propelled by the electric motor 140) and steering wheels 160 for changing direction. There are various different configurations possible for placement of the wheels 125—including drive wheels 155 and steering wheels 160) in the robot 100.

The positioning unit 130 may be inclusive of various location-aware components, including GPS, location beacon transceivers, etc., identifying the location of the robot 100 and ensuring that the robot 100 remains on the designated route. The communications unit 135 may include any type of communications interface or network interfaces known in the art for communicating with the central server.

Figure 2:
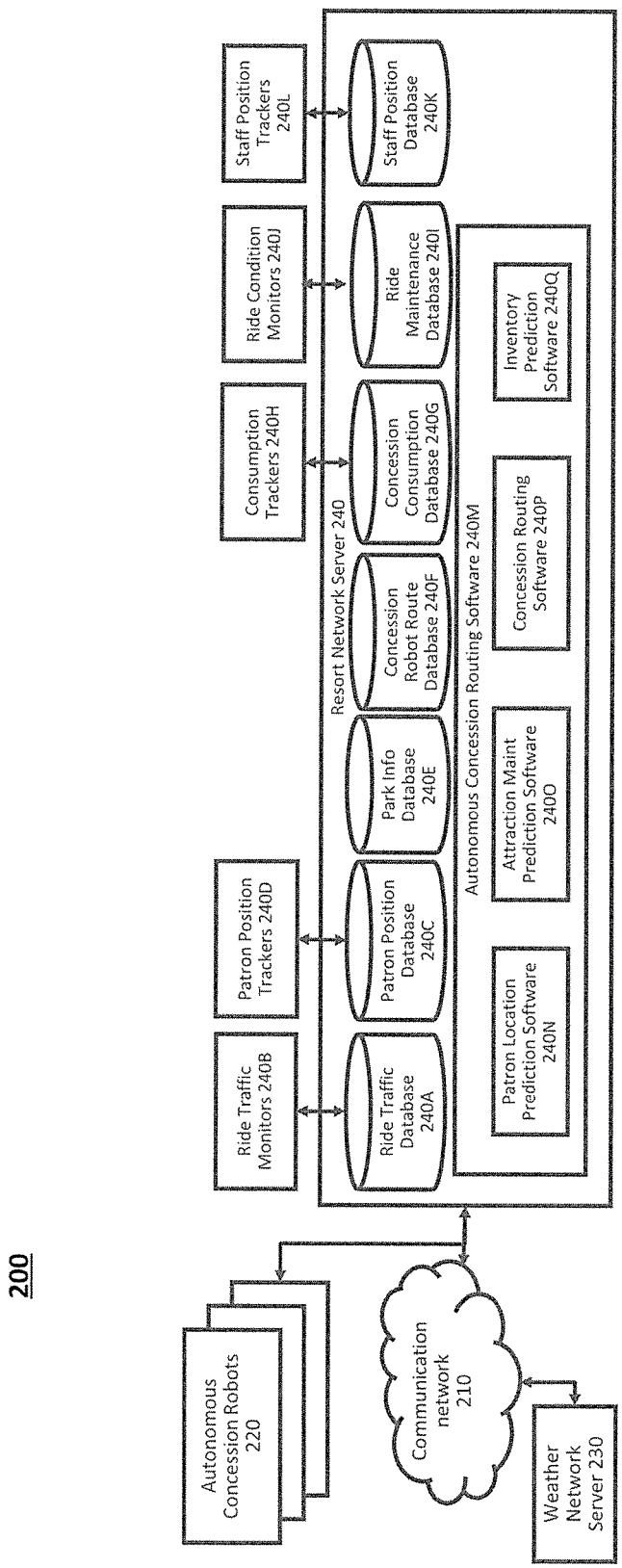
FIG. 2 illustrates an exemplary network environment in which a system for managing autonomous concession robots may be implemented.

FIG. 2 illustrates an exemplary network environment 200 in which a system for managing autonomous concession robots may be implemented. Network environment 200 may include communication network 210 through which the other devices may communicate. Such other devices include one or more autonomous concessions robots 220, a weather network server 230, and a resort network server 240.

Communication network 210 may be a local, proprietary network (e.g., an intranet) and/or may be a part of a larger wide-area network. The communications network 210 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 210 allows for communication between the various components of network environment 200.

Autonomous concessions robots 220 may correspond to the autonomous concession robot 100 described with respect to FIG. 1. Such robots 220 may dispense different items and be configured differently with respect to housing or wheels. The selection of dispensed items and configuration may be made as needed in response to venue needs.

Weather network server 230 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server. Weather network server 230 maintains information regarding weather, including past weather conditions, present weather conditions, and trends and predictions regarding future weather conditions at and around the venue.

Resort network server 240 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Resort network server may include ride traffic database 240A (which may be in communication with ride traffic monitors 240B), patron position database 240C (which may be in communication with patron position trackers 240D), park information database 240E, concession robot route database 240F, concession consumption database 240G (which may be in communication with consumption trackers 240F), ride maintenance database 240I (which may be in communication with ride condition monitors 240J), staff position database 240K (which may be in communication with staff trackers 240L), and concession routing software 240M (which may include patron location prediction software 240N, attraction maintenance prediction software 240O, concession routing software 240P, and inventory prediction software 240Q).

Each attraction in the resort may have a ride traffic monitor 240B, which calculates the wait time for that attraction and communicates it to the ride traffic database 240A on the resort network server 240 to serve as a historical record of the wait time for that attraction at any given time and date. Patron position trackers 240D are devices that track the location of various patrons and thereby allow the resort network server 240 to identify the location of a patron at any given time. That information is communicated in real-time to the resort network server 240 and stored in the patron position database 240C so that the concession routing software 240M can access historic patron positions. Consumption trackers 240H may be located at every point in the resort at which a patron can make a purchase. New inventory may be entered into the concession consumption database 240G, and purchases made at each point update the inventory level in the database 240G in real-time. The concession consumption database 240G may keep historical consumption and inventory levels for reference. Rides condition monitors 240J use optical sensors to detect increases in vibration in a ride. Those changes may be used to predict needed maintenance and the information gathered by the ride condition monitors 240J is communicated to the resort network server 240 and stored in the ride maintenance database 240I.

The resort network server 240 contains two additional databases (park information database 240E and concession robot route database 240F) that are not directly populated by monitors or trackers distributed throughout the resort. The park information database 240F may contain information such as park maps, events calendars, ticket sales, etc. The concession robot route database 240F may be used by the concession routing software 240M to store and edit the route for each autonomous concession robot 220.

The concession routing software 240M begins execution at the start of the operating day for the venue. The concession routing software 240M may calculate an initial route and inventory for each autonomous concession robot 220 and communicates the same to those robots 220. The route may be calculated by retrieving information from both the weather network server 230 and the park information database 240E. For example, a predicted weather pattern and a schedule of events may be used to identify similar days in the venue's history. Consumption data may be retrieved from the consumption tracking database 240G for those historical dates identified as having similar weather and scheduled events. Concession sales data from these identified days may further be parsed by hour and location. The top selling items at each location for each hour may be identified. The average profit (e.g., margin times quantity sold) may be calculated for each product time and location. Each route, including the time necessary to travel to each location, may then be calculated, along with the calculated profit figures. The route that is expected to yield the most profit may then be identified and communicated to the robot(s) 220.

After the initial route is sent to the robot(s) 220, the tracking and monitoring devices (e.g., ride traffic monitors 240B, patron position trackers 240D, consumption trackers 240 H, and ride condition monitors 240J) may be polled for new data events. Each time a new data event is received, patron location prediction software 240N, attraction maintenance prediction software 240O, and inventory prediction software 240Q may be executed. If the data event is from a ride condition monitor 240J and is indicative of that attraction being in need of maintenance, then that location may be flagged. If the data event is from a patron position tracker 240 D and is indicative of predicted patron density being greater or less than expected at a given location by more than a predetermined threshold (in this example 20%), that position may be flagged. If the data event is from a consumption tracker and is indicative of low sales at a given location, the patron position trackers are polled to determine if the patron density at the identified location is higher than expected based upon historical levels. If both sales are low and patron density is high, that location may be flagged with a new sales forecast. If any locations have been flagged for any reason, the concession routing software 240P may be re-run with the new information and any adjustments to the route of one more autonomous concession robot 220. The new route may then be communicated to that robot 220.

Figure 3:
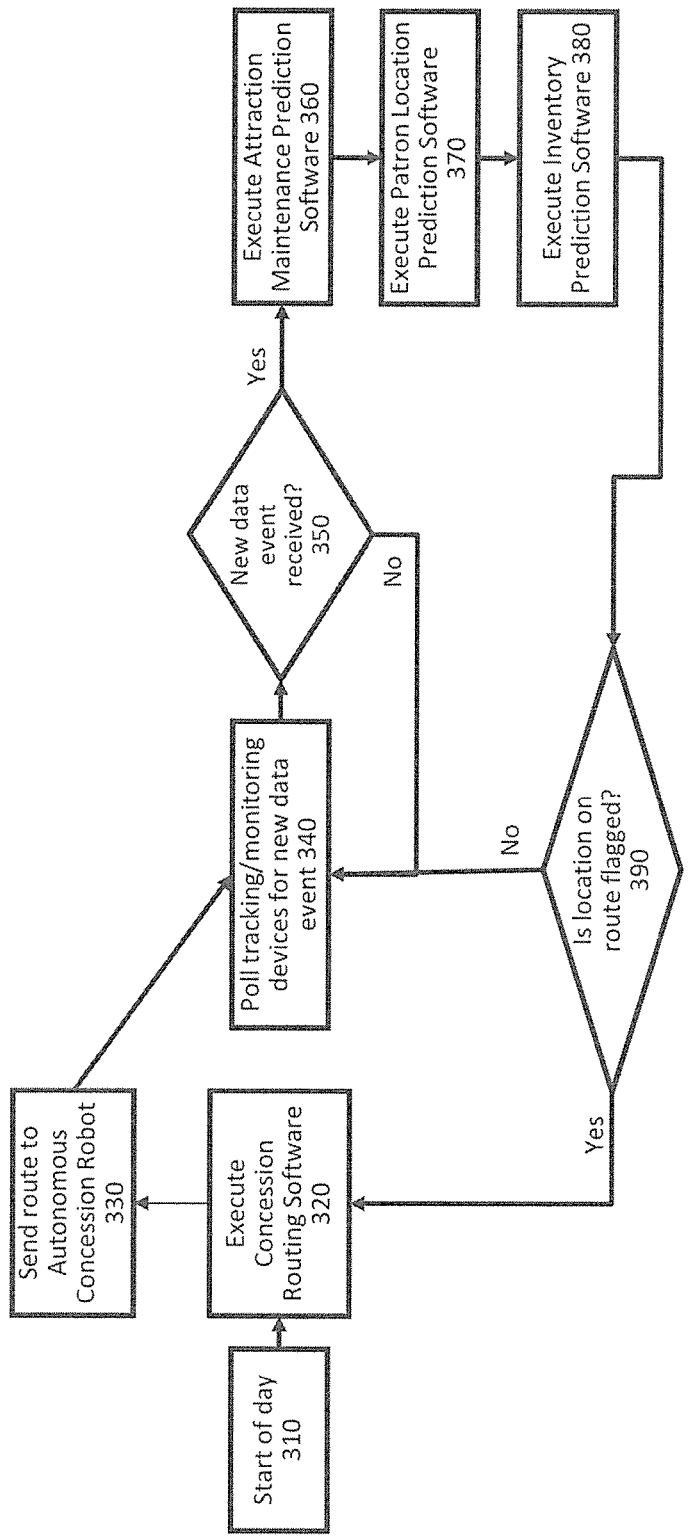
FIG. 3 is a flowchart illustrating an exemplary routing method performed managing autonomous concession robots.

FIG. 3 is a flowchart illustrating an exemplary routing method 300 performed in managing autonomous concession robots 100. Such method 300 may be used to identify where and when the services of the autonomous concession robots 100 are needed, as well as the extent of the need.

In step 310, the operating day for the venue starts, which may include powering up various devices illustrated in FIG. 2. In step 320, the concession routing software 240P may be executed. In step 330, the initial route is sent to the robot(s) 100.

In step 340, the tracking and monitoring devices (e.g., ride traffic monitors 240B, patron position trackers 240D, consumption trackers 240 H, and ride condition monitors 240J) are polled for new data events. Each time a new data event is received in step 350, the resort network server may execute the attraction maintenance prediction software 240 M in step 360, patron location prediction software 240N in step 370, and inventory prediction software 240Q in step 380. If new data is not received, the method returns to step 340 to continue polling for new data events.

In step 390, it is determined whether any locations on the route were flagged. If not, the method returns to step 340 to poll the tracking/monitoring devices (e.g., ride traffic monitors 240B, patron position trackers 240D, consumption trackers 240 H, and ride condition monitors 240J) for more new data. If some locations are flagged, the method returns to step 320, in which the concession routing software 240P is executed based on the new information in order to generate updated routes as necessary.

Figure 4:
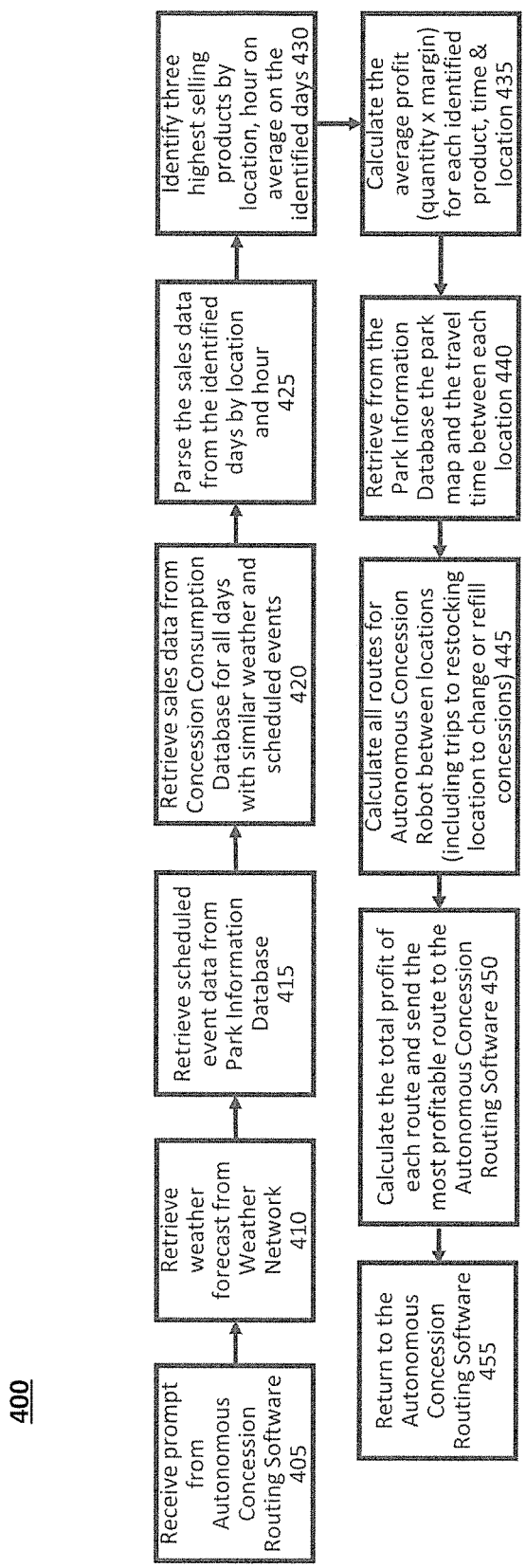
FIG. 4 is a flowchart illustrating an exemplary routing method performed in managing autonomous concession robots.

FIG. 4 is a flowchart illustrating an exemplary routing method 400 performed in managing autonomous concession robots. Such a method 400 may be used to calculate an initial route and inventory for each autonomous concession robot 100 and communicates the respective routes to the robots 100.

In step 405, a prompt may be received from concession routing software 240P (e.g., at the beginning of a day or other designated operational time period). In step 410, information may be retrieved from both the weather network server in step 410, from the park information database 240E in step 415. The predicted weather and scheduled events may be used to identify similar days in the resort's history. In step 420, consumption data may be retrieved from the consumption tracking database 240G for those historical dates identified as having similar weather and scheduled events. In step 425, the concession sales data from these identified days may be parsed by hour and location. In step 430, the top selling items at each location for each hour may be identified. In step 435, the average profit (margin times quantity sold) may be calculated for each product time and location.

In step 440, the park information database 240E provides a park map and travel time information between locations on the map. In step 445, each route—including the time necessary to travel to each location—may be calculated, along with the associated profit figures calculated in step 450. Step

450 further includes identifying the routes expected to yield the most profit and communicating the routes to the robot(s) 100.

Figure 5:
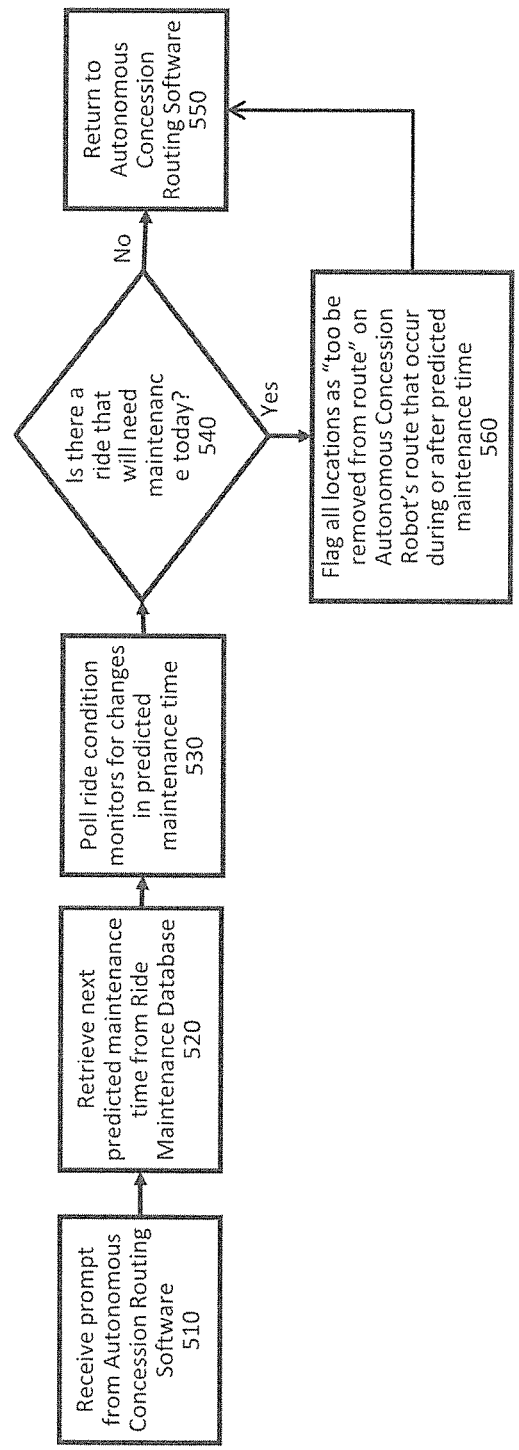
FIG. 5 is a flowchart illustrating an exemplary maintenance method in a system for managing autonomous concession robots.

FIG. 5 is a flowchart illustrating an exemplary maintenance method 500 in a system for managing autonomous concession robots 100. In step 510, a prompt may be received from concession routing software 240P (e.g., at the beginning of a day or other designated operational time period).

In step 520, a next predicted maintenance time may be retrieved from ride maintenance database 240I. In step 530, ride condition monitors 240J may be polled for changes that may affect predicted maintenance time. For example, rides condition monitors 240J may include optical or other sensors that detect increased vibration levels in certain ride equipment. Such changes in vibration levels may be used to predict needed maintenance. As such, and the information gathered by the ride condition monitors 240J may be communicated to the resort network server 240 and stored in the ride maintenance database 240I. During the operation of the concession routing software 240P, it may be determined in step 540 whether the ride condition monitors 240J yielded a result that indicates an attraction has an urgent need for maintenance.

If not, the method proceeds to step 550 in which concession routing software 240P may continue to execute in accordance with previous predictions and other data. If there is an urgent maintenance need, however, the method proceeds to step 560 in which one or more locations may be flagged for removal from the route of the autonomous concession robot 100. The method may then proceed to step 550 in which routing software 240N is executed based on the newly flagged locations.

Figure 6:
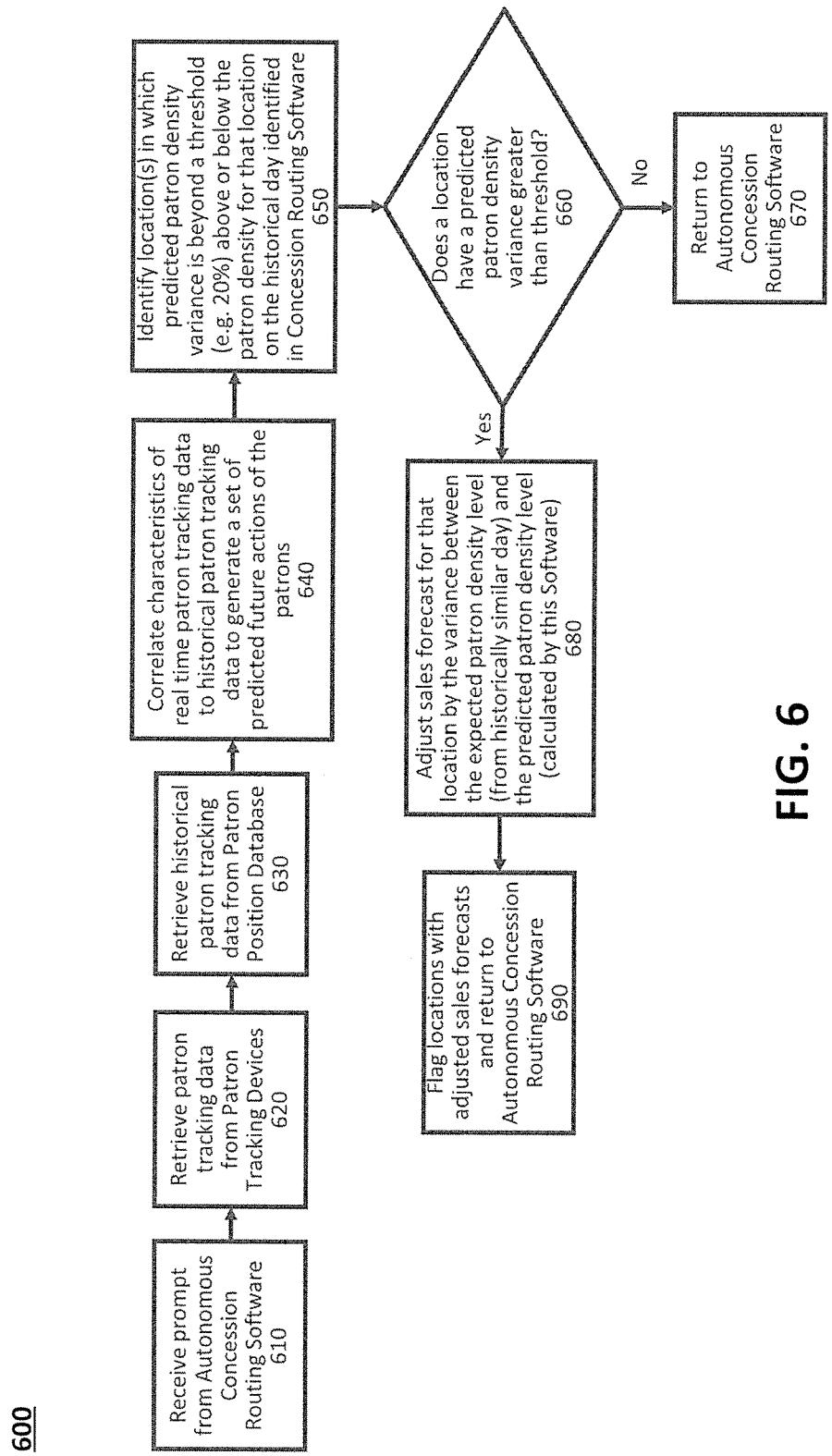
FIG. 6 is a flowchart illustrating an exemplary patron location prediction method performed in managing autonomous concession robots.

FIG. 6 is a flowchart illustrating an exemplary patron location prediction method 600 performed in managing autonomous concession robots. In step 610, a prompt may be received from concession routing software 240P (e.g., at the beginning of a day or other designated operational time period). In step 620, a new data event is received from a patron position tracker 240D, and the patron location prediction software 240N may be executed so as to predict the future positions of the patrons based on the new data.

In step 630, historical patron tracking data is retrieved from patron position database 240C. In step 640, characteristics of real-time patron tracking data may be correlated to historical patron tracking data to generate a set of predicted future actions of the patrons. In step 650, location(s) may be identified in which predicted patron density variance beyond a threshold (e.g. 20%) above or below the patron density for that location on the historical day. In step 660, each location may be evaluated as to whether its variance exceeds the threshold. If not, the method proceeds to step 670 in which the concession routing software 240P may continue to execute in accordance with previous data.

If so, the method proceeds to step 680 in which the sales forecast for that location by the variance between the expected patron density level (from historically similar day) and the predicted patron density level may be adjusted. If the new data is indicative of predicted patron density being greater or less than expected at a given location by more than a predetermined threshold (in this example 20%), that position is flagged in step 690.

Figure 7:
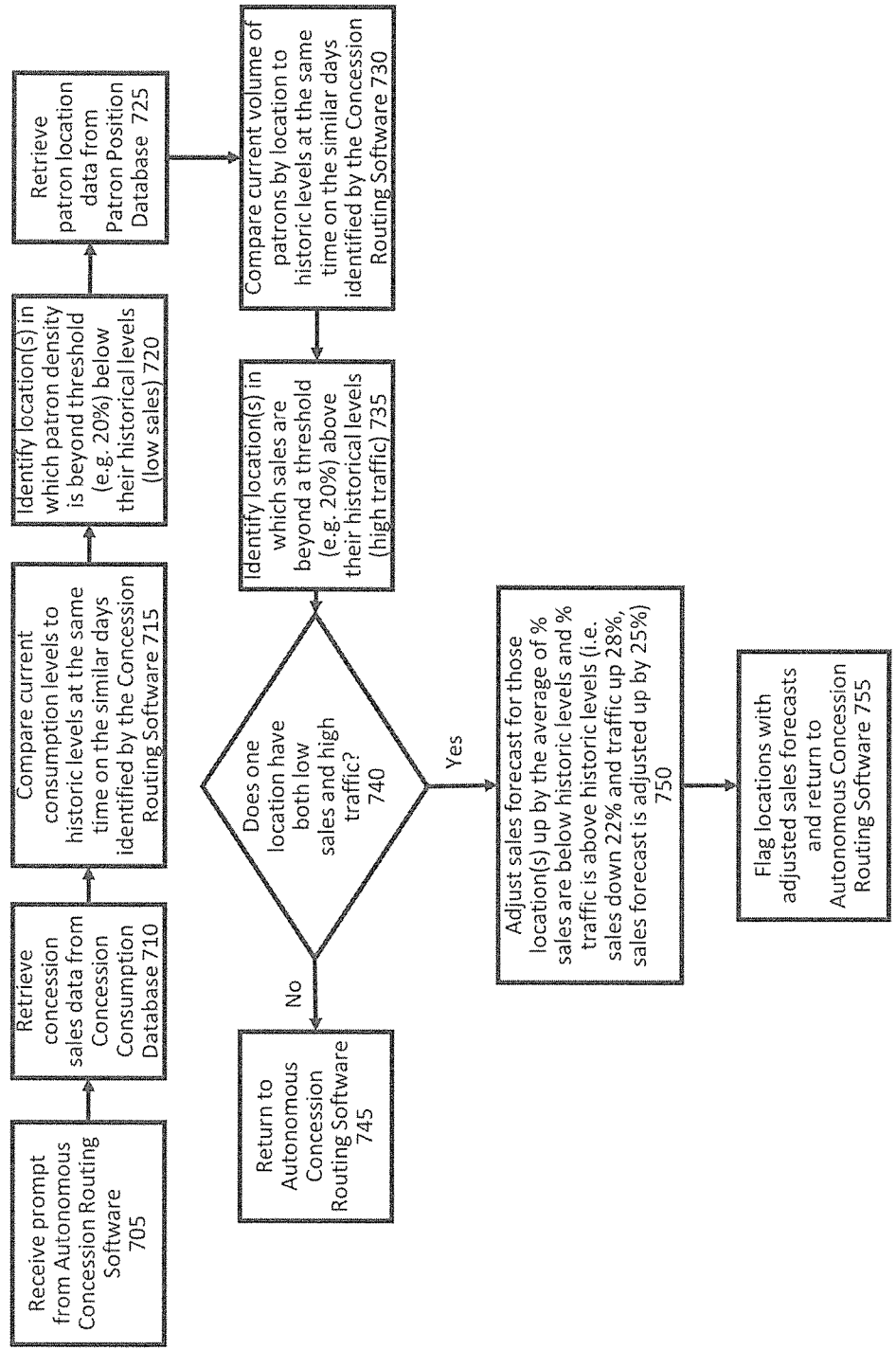
FIG. 7 is a flowchart illustrating an exemplary inventory prediction method performed in managing autonomous concession robots.

FIG. 7 is a flowchart illustrating an exemplary inventory prediction method 700 performed in managing autonomous concession robots. The inventory prediction software 240Q may be run each time a new data event is received by the resort server 240. If the data event is from a consumption tracker 240H and is indicative of low sales at a given location, the patron position trackers 240D may be polled to determine if the patron density at the identified location is higher than expected based upon historical levels. If both sales are low and patron density is high, that location is flagged with a new sales forecast.

In step 705, a prompt may be received from concession routing software 240P (e.g., at the beginning of a day or other designated operational time period). In step 710, concession sales data from concession consumption database 240G may be retrieved. In step 715, current consumption levels may be compared to historic levels at the same time on the similar days as identified by execution of the concession routing software 240P. In step 720, location(s) in which sales are beyond a threshold (e.g. 20%) below their historical levels (low sales) may be identified.

In step 725, patron location data may be retrieved from patron position database 240C. In step 730, the current volume of patrons by location may be compared to historic levels at the same time on the similar days as identified by the execution of concession routing software 240P. In step 735, location(s) in which sales are beyond a threshold (e.g. 20%) above their historical levels (high traffic) may be identified. In step 740, it may be determined whether one location has both low sales and high traffic. If not, the method proceeds to step 745 in which concession routing software 240P may continue to execute in accordance with previous predictions and other data.

If so, sales forecast for those location(s) may be adjusted up by the average of sales are below historic levels and % traffic is above historic levels (i.e. sales down 22% and traffic up 28%, sales forecast is adjusted up by 25%) in step 750. In step 755, locations with adjusted sales forecasts may be flagged, and the method may concession routing software 240P may continue to execute in accordance with the adjusted information.

Figure 8:
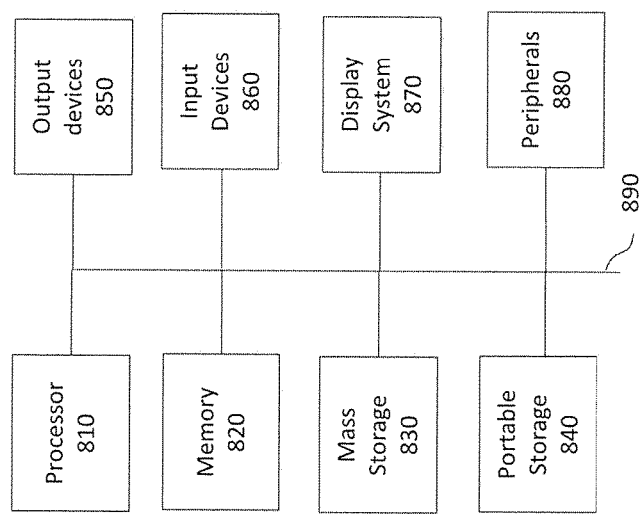
FIG. 8 illustrates an exemplary computing system (i.e. user device) that may be used to implement an embodiment of the present disclosure.

FIG. 8 illustrates an exemplary computing system 800 that may be used to implement an embodiment of the present disclosure. The computing system 800 of FIG. 8 includes one or more processors 810 and memory 820. Main memory 820 stores, in part, instructions and data for execution by processor 810. Main memory 820 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and main memory 820 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing embodiments of the present disclosure for purposes of loading that software into main memory 820.

Portable storage device 840 operates in conjunction with a portable non-volatile storage medium, such as a floppy disk, compact disk or Digital video disc, to input and output data and code to and from the computer system 800 of FIG. 8. The system software for implementing embodiments of the present disclosure may be stored on such a portable medium and input to the computer system 800 via the portable storage device 840.

Input devices 860 provide a portion of a user interface. Input devices 860 may include an alpha-numeric keypad, such as a keyboard, for inputting alpha-numeric and other information, or a pointing device, such as a mouse, a trackball, stylus, or cursor direction keys. Additionally, the system 800 as shown in FIG. 8 includes output devices 850. Examples of suitable output devices include speakers, printers, network interfaces, and monitors.

Display system 870 may include a liquid crystal display (LCD) or other suitable display device. Display system 870 receives textual and graphical information, and processes the information for output to the display device.

Peripherals 880 may include any type of computer support device to add additional functionality to the computer system. For example, peripheral device(s) 880 may include a modem or a router.

Figure 9:
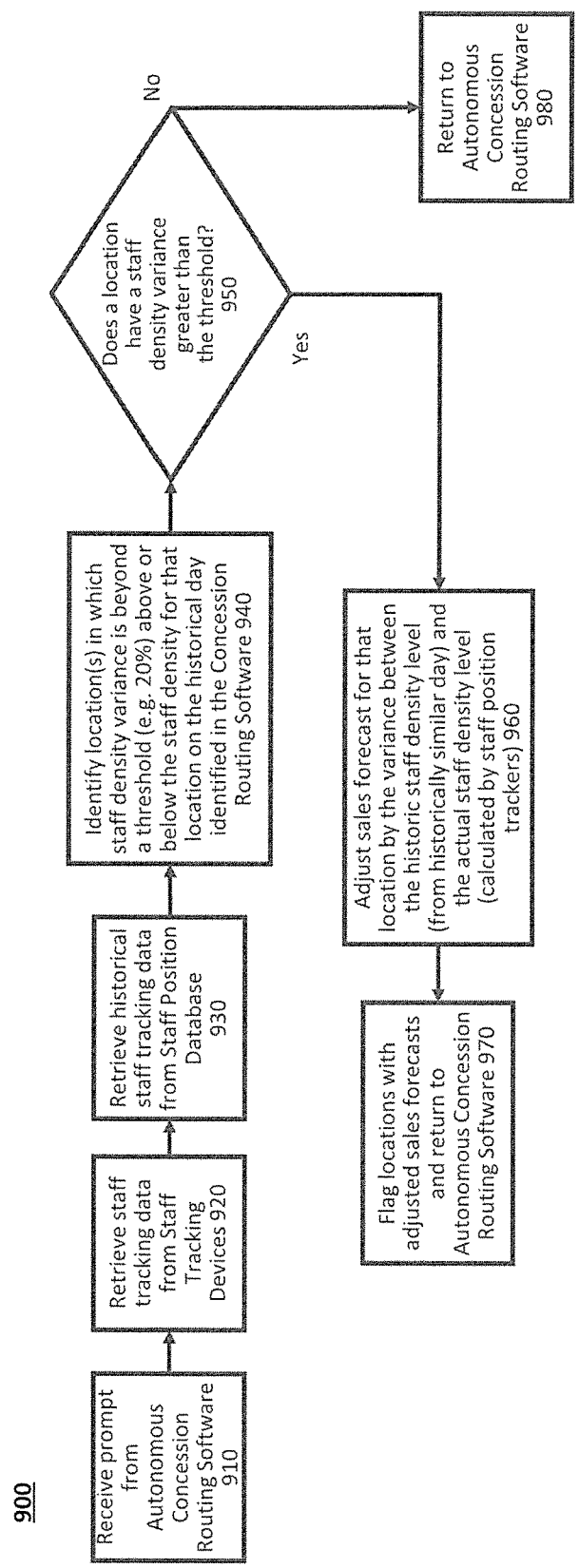
FIG. 9 is a flowchart illustrating an exemplary staff location adjusittient method performed in managing autonomous concession robots.

FIG. 9 is a flowchart illustrating an exemplary staff location adjustment method 900 performed in managing autonomous concession robots.

In step 910, a prompt is received from concession routing software 240P (e.g., after receiving a new data event that is from a staff tracking device 240L). In step 920, staff tracking data is retrieved from staff tracking device 240L.

In step 930, historical staff data is retrieved from staff position database 240K and in step 940, compared to staff tracking data for similar days (e.g., in terms of weather and events as determined by concession routing software 240P). In step 950, each location may be evaluated to identify whether the actual density of staff at a given location is greater or less than historic data at a given location by more than a predetermined threshold (e.g., 20%)\.

If yes, then the method proceeds to step 960 in which sales forecast may be adjusted for that location by the variance between the historic staff density level (e.g., from historically similar day) and the actual staff density level (e.g., as calculated by staff position trackers 240L). From there, the method may proceed to step 970 in which the identified position is flagged as the concession robot may be more desirable in an area with less staff than normal; whereas in areas where there is more staff than expected, the robot would yield less return so that area would be de-prioritized.

If the location does not have a staff density variance that is greater than the threshold, the method may proceed to step 980 in which concession routing software may be further executed.

Figure 10:
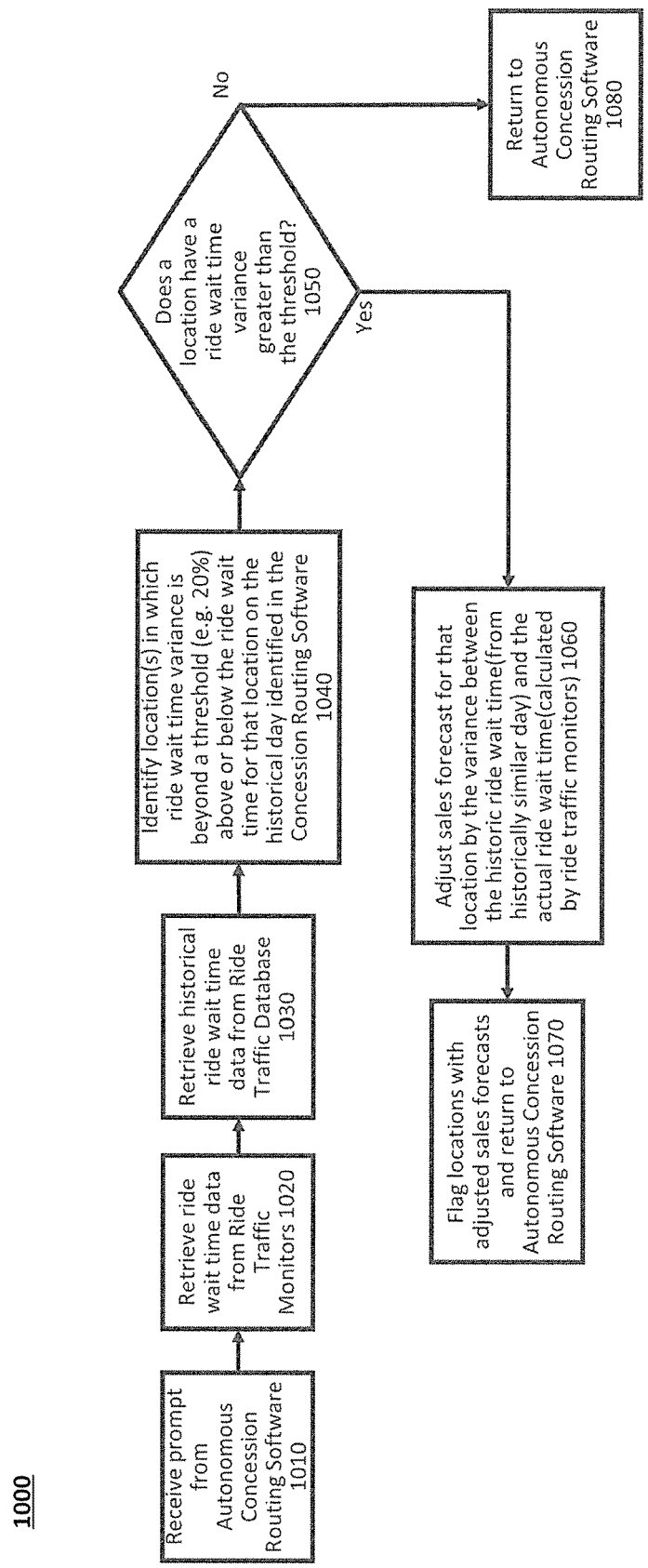
FIG. 10 is a flowchart illustrating an exemplary ride traffic management method performed in managing autonomous concession robots.

FIG. 10 is a flowchart illustrating an exemplary ride traffic management method 1000 performed in managing autonomous concession robots. Such a method 1000 may be performed when the concession routing software 240P receives a new data event (e.g., from ride monitoring device 240B) and provides a prompt in step 1010.

In step 1020, ride wait time data may be retrieved from ride traffic monitors 240B. In step 1030, historical ride wait time may be retrieved from ride traffic database 240A. In step 1040, the ride wait time data is used compared to historic ride wait time data for similar days (e.g., in terms of weather and events as determined by concession routing software 240P).

In step 1050, the location is evaluated to determine whether the actual ride wait time at a given location is greater or less than historic data at a given location by more than a predetermined threshold (e.g., 20%). If so, the method may proceed to step 1060 in which the sales forecast for that location is adjusted to account for the variance in ride wait time. From there, the method may proceed to step 1070 in which the position is flagged as the concession robot is more desirable in an area with longer wait times than normal (e.g., where guests are stationary for a longer amount of time and typically cannot make purchases while in line). In areas where the ride wait time is less than expected, the robot would yield less return so that area would be de-prioritized.

Where the location variance is not greater than the threshold, the method may proceed to step 1080 in which concession routing software may be further executed.

Figure 11:
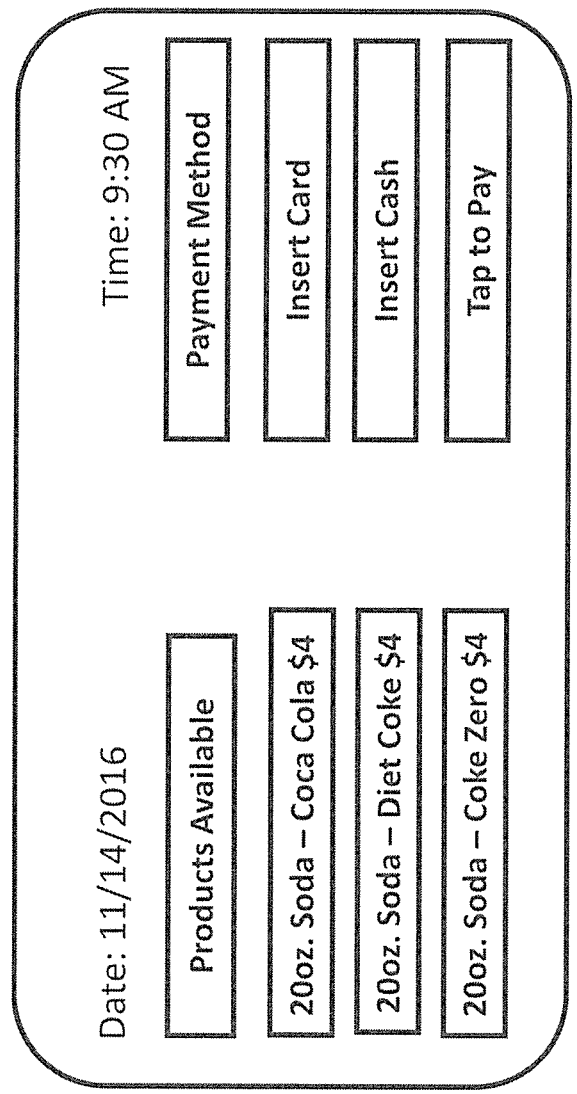
FIG. 11 illustrates an exemplary autonomous concession robot GUI.

FIG. 11 illustrates an exemplary autonomous concession robot GUI 1100. The autonomous concession robot GUI 1100 may appear on the autonomous concessions robot 100 and may assist guests in making purchases. The left side of the autonomous concession robot GUI 1100 may include a menu of products available where each option is selectable via button. The right hand side of the autonomous concession robot GUI 1100 may include a series of buttons for the user to select a desired payment method, which may include but is not limited to, credit/debit cards with magnetic strips or NFC capabilities that can be read by a chip reader, cash, or other payment method (e.g., Apple Pay). The confirmation of a payment may result in opening of the inventory container (e.g., which be specific to the product selected in a robot 2100 may include multiple containers). Optical or weight sensors 110 in or around the inventory container of the robot 100 may be used to determine if the user took more than what they paid for, where the transaction price may be adjusted accordingly.

Figure 12:
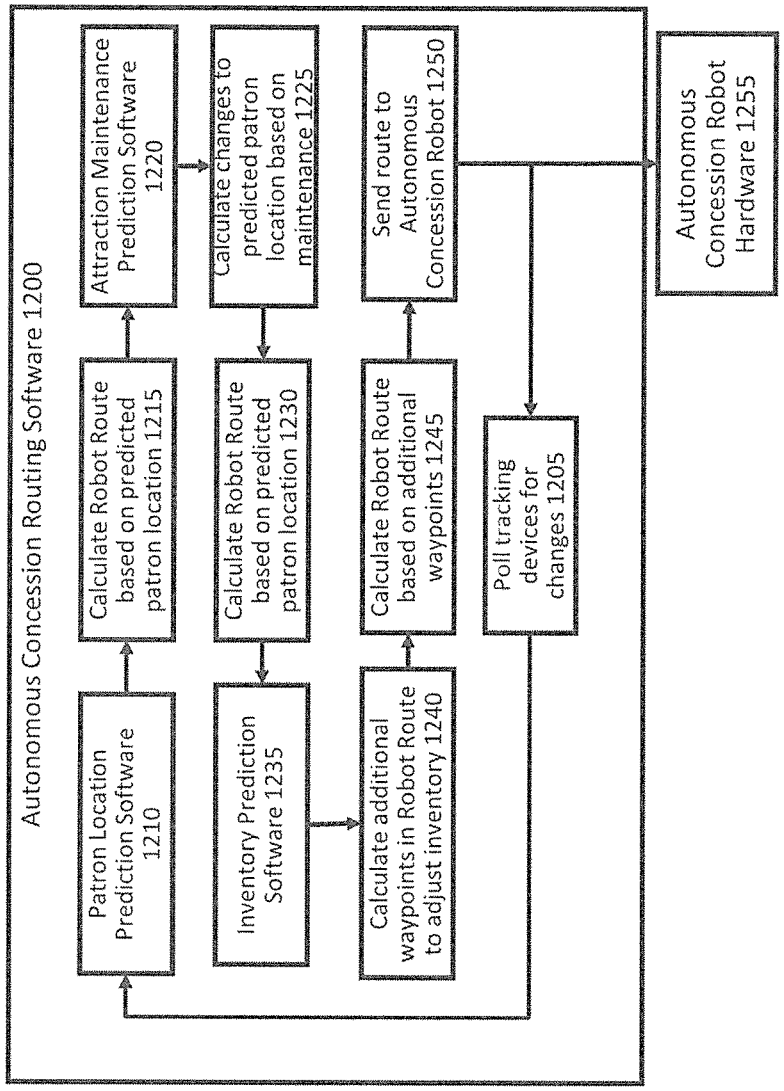
FIG. 12 is a flowchart illustrating an exemplary resort concessions method performed in managing autonomous concession robots.

FIG. 12 is a flowchart illustrating an exemplary resort concessions method 1200 performed in managing autonomous concession robots. Method 1200 illustrates an exemplary general method for providing autonomous concessions via autonomous mobile concessions robot 100 (e.g., for selling food and other items within a resort or theme park). Using data from the park or resorts central platform or electronic ticketing system, the autonomous concessions robot 100 can move to areas of the resort where there is predicted to be more demand (e.g., based on where the most tickets are being scanned or by tracking when the last time people with electronic tickets have checked in to a restaurant).

In step 1205, tracking devices may be polled for changes in conditions. In step 1210, patron location prediction software 240N may be executed. In step 1215, a route may be calculated based on predicted patron location. In step 1220, attraction maintenance prediction software 240O may be executed. In step 1225, changes to predicted patron location may be calculated based on the maintenance prediction. In step 1230, the robot route may be calculated based on updated patron location.

In step 1235, inventory prediction software 240Q may be executed. In step 1240, additional waypoints may be calculated in the robot route to adjust inventor. In step 1245, the robot route may be calculated based on additional waypoints. In step 1250, the route may be sent to the autonomous concession robot 100 (which may include hardware 1255). The method may then revert back to step 1205 in which tracker devices may be polled for additional change data.

The components contained in the computer system 800 of FIG. 8 are those typically found in computer systems that may be suitable for use with embodiments of the present disclosure and are intended to represent a broad category of such computer components that are well known in the art. Thus, the computer system 800 of FIG. 8 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A concessions robot device, the device comprising:
   a body comprising a dispensing container for holding one or more items to be dispensed;
   a motor within the body;
   a plurality of wheels;
   a communication interface configured to receive instructions sent over a communication network regarding a designated route; and
   a processor configured to execute the received instructions, wherein execution of the instructions by the processor automatically:
   powers up the motor, wherein the body is propelled forward, and
   steers the wheels along the designated route, wherein the one or more items are dispensed at one or more points on the designated route, and
   wherein the concessions robot moves autonomously along the designated route which is determined according to correlations between actual staff density and a historic staff density level.

2. The concessions robot device according to claim 1, further comprising an electronic lock,
   wherein execution of the instructions by the processor automatically engages the electronic lock to close the dispensing container while the concessions robot is moving on the designated route.

3. The concessions robot device according to claim 2, further comprising a payment terminal,
   wherein execution of the instructions by the processor automatically disengages the electronic lock to open the dispensing container at a time of payment to the payment terminal.

4. The concessions robot device according to claim 1, further comprising:
   an imaging sensor placed within the dispensing container to capture a retrieved item from the dispensing container; and
   a payment terminal;
   wherein execution of the instructions by the processor automatically charges a fee corresponding to the retrieved item to a payment method used at the payment terminal.

5. The concessions robot device according to claim 1, wherein the concessions robot moves autonomously along the designated route which is determined according to correlations between at least one of concession consumption data stored in a concession consumption database and patron position data stored in a patron position database.

6. The concessions robot device according to claim 1, wherein
   the designated route is determined to tend to avoid a specific area after it is determined that the actual staff density at the area is greater than the historic staff density level at the area.

7. A method for controlling a concessions robot device which includes a body comprising a dispensing container for holding one or more items to be dispensed, a motor within the body, a communication interface configured to receive instructions sent over a communication network regarding a designated route; and a processor configured to execute the received instructions; the method comprising:
   forwarding instructions to the processor regarding the designated route; and
   upon receipt of the instructions via the communication interface, providing power to the motor, which is configured to propel the body forward in accordance with the designated route;
   wherein the one or more items are dispensed at one or more points on the designated route, and
   wherein the concessions robot moves autonomously along the designated route which is determined according to correlations between actual staff density and a historic staff density level.

8. The method of controlling a concessions robot device according to claim 7, wherein the concessions robot moves autonomously along the designated route which is determined according to correlations between at least one of concession consumption data stored in a concession consumption database and patron position data stored in a patron position database.

9. The method of controlling a concessions robot device according to claim 7, wherein execution of the instructions by the processor automatically engages an electronic lock provided on the concessions robot device to close the dispensing container while the concessions robot is moving on the designated route.

10. The method of controlling a concessions robot device according to claim 9, wherein execution of the instructions by the processor automatically disengages the electronic lock to open the dispensing container at a time of payment via a payment terminal provided on the concessions robot device.

11. The method of controlling a concessions robot device according to claim 10, further comprising:
    capturing an image of a retrieved item which is taken from the dispensing container by a customer, said image being captured by an image sensor;
    wherein execution of the instructions by the processor automatically charges a fee corresponding to the retrieved item to a payment method used at the payment terminal provided on the concessions robot device.

12. The concessions robot device according to claim 7, wherein
    the designated route is determined to tend to avoid a specific area after it is determined that the actual staff density at the area is greater than the historic staff density level at the area.

13. A system for controlling routing of an autonomous concessions robot device around a venue, the system comprising:

the autonomous concessions robot device comprising:

a body comprising a dispensing container for holding one or more items to be dispensed;

a motor within the body;

a plurality of wheels;

a communication interface configured to receive instructions sent over a communication network regarding a designated route; and a processor configured to control the motor to move the concessions robot device autonomously along the designated route;

a first tracking device configured to sense a position of the autonomous concessions robot device in the venue; and a server configured to:

store in one or more databases records of concession consumption data and of the position and number of patrons within the venue sensed at a plurality of different times;

calculate, based on correlations between actual staff density and a historic staff density level, the designated route; and transmit the designated route to the autonomous concessions robot device to control the autonomous concessions robot device to move the concessions robot device autonomously along the calculated route.

14. The concessions robot device according to claim 13, wherein the designated route is determined to tend to avoid a specific area after it is determined that the actual staff density at the area is greater than the historic staff density level at the area.

* * * * *